Dec. 18, 1928.
H. T. NOYES ET AL
1,695,816
PRODUCTION OR MANUFACTURE OF DISKS OR BLANKS FOR BUTTONS
OR THE LIKE FROM IRREGULARLY SHAPED PIECES OF MATERIAL
Filed Dec. 29, 1922
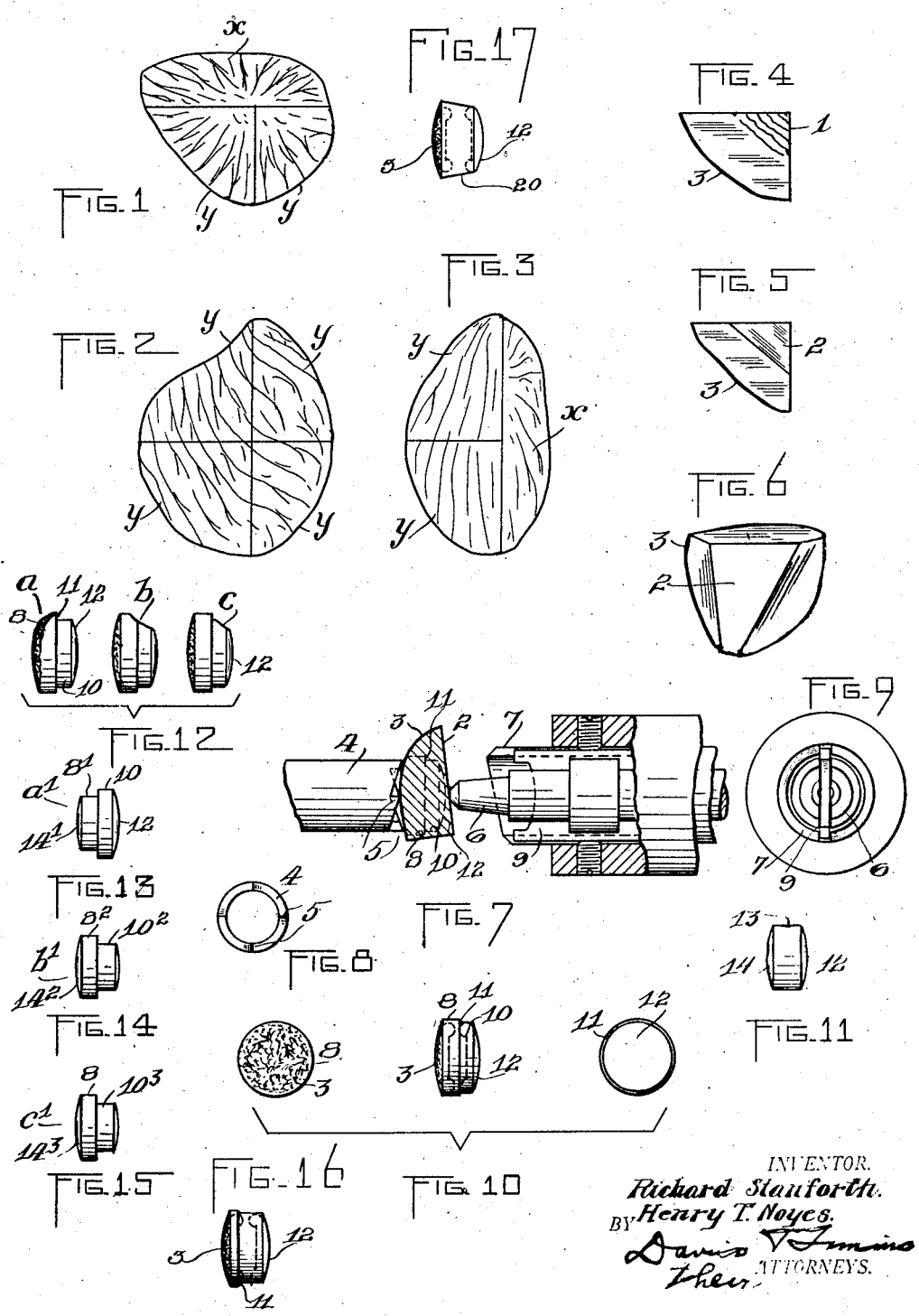
INVENTOR.
Richard Stanforth.
BY Henry T. Noyes.
ATTORNEYS.

Patented Dec. 18, 1928.

1,695,816

UNITED STATES PATENT OFFICE.

HENRY T. NOYES AND RICHARD STANFORTH, OF ROCHESTER, NEW YORK, ASSIGNORS TO ART IN BUTTONS INCORPORATED, OF ROCHESTER, NEW YORK, A CORPORATION OF NEW YORK.

PRODUCTION OR MANUFACTURE OF DISKS OR BLANKS FOR BUTTONS OR THE LIKE FROM IRREGULARLY-SHAPED PIECES OF MATERIAL.

Application filed December 29, 1922. Serial No. 609,707.

The present invention relates to the production or manufacture or disks, or blanks for buttons, or the like, from irregularly shaped pieces of material, and an object of the invention is to convert such material into pieces, each preferably mechanically measurable and having an article forming portion with a finished perimeter and at least a partly surrounding shoulder beyond the finished perimeter of such article forming portion, facilitating the automatic and mechanical handling of the converted piece in the various operations in the method of forming the article contained therein. A further object of the invention is to cut such converted pieces from the irregularly shaped pieces in such a manner as to retain in the converted pieces the maximum possibilities of the irregularly shaped pieces in disks, or blanks for buttons, or the like. A further object of the invention is to provide on each converted piece an original surface side of the irregularly shaped material and also a plurality of article forming portions of different diameters. Still another object of the invention is to provide the converted pieces each with a plurality of article forming portions of different diameters, the one of greatest diameter being adjacent an original surface side of the irregularly shaped material and being greater in diameter than the article to be formed therefrom, so as to protect such article during bulk handling and to provide for possible shrinkage in such portion; and later to remove such excess material in the article forming portion of larger diameter. Another and still further object of the invention is to provide on the shouldered converted piece, a formed transverse surface on that portion with the smaller diameter, which may be utilized as a gauging surface for the mechanical measurement and also as a surface by which the converted piece may be properly and mechanically positioned or placed in the mechanical measuring devices and in the cutting and forming machines. Still another and further object of the invention is to provide a converted piece of circular form with a skin or original surface on one side and a formed surface on the opposite side, the perimeter of the piece between these two surfaces having a plurality of diameters, the greatest diameter being preferably adjacent the skin or original side.

To these and other ends, the invention consists of certain steps and combinations of steps in a method of producing disks, or blanks for buttons, or the like, from irregularly shaped pieces of material, as well as in certain new features in a converted piece, all of which will be hereinafter described and the novel features pointed out in the appended claims.

In the drawings:

Figs. 1, 2 and 3 are views of three sides of a so-called "ivory" nut, the straight lines showing typical saw cuts made through such a nut;

Fig. 4 is a side view of one of the irregularly shaped pieces before the pithy portion of the piece is removed;

Fig. 5 is a similar view of the piece, showing the pithy portion removed to provide a flat side only approximately parallel with the skin side;

Fig. 6 is another view of the irregularly shaped piece illustrated in Fig. 5;

Fig. 7 is a fragmentary view of the gauging, holding and cutting means for the irregularly shaped pieces;

Fig. 8 is an end view of the gauging means;

Fig. 9 is an end view of the cutter and holding means;

Fig. 10 illustrates three views of one of the converted pieces, complete in every respect;

Fig. 11 shows a plural blank with the surrounding shoulder and skin side removed;

Fig. 12 illustrates three converted pieces incomplete in one or more of the article forming portions;

Figs. 13, 14 and 15 show three plural blanks obtained by recutting the blanks with incomplete portions illustrated in Fig. 12;

Fig. 16 is a view of another embodiment of the invention in which the shoulder is positioned on the converted piece at a point other than at a division between the article forming portions; and Fig. 17 is a detail view of another embodiment of the invention in which the plural blank has a tapering perimeter so that article forming portions of different diameters are provided.

While the invention is herein described and illustrated in connection with irregularly shaped pieces formed from so-called "ivory" nuts, it is to be understood that some features of this invention are not limited to irregularly shaped pieces obtained from such source. When nuts are employed for obtaining the irregularly shaped pieces, these nuts are cut to obtain therefrom the most desirable pieces. For example, a nut such as illustrated in Figs. 1 to 3 of the drawings, may be cut on the lines indicated to provide a slab $x$ and four pieces $y$. The slab $x$ may be used in any suitable manner, but it is customary to employ this slab principally for the production of large buttons, such as are used on overcoats. Each of the pieces $y$ has a skin or original surface side 3 thereon and, in most instances, a pithy portion 1, formed by the center of the nut. This pithy portion is preferably removed to provide a flat or original surface side 2 on the irregularly shaped piece, which is only approximately parallel with the skin or original surface side 3.

The irregularly shaped pieces obtained through the above means or from other sources are according to this invention preferably roughly classified for size, as for diameter and thickness. The irregularly shaped pieces are then converted into pieces, preferably of circular form, which retain the maximum possibilities in disks, or blanks for buttons, or the like, for each class of the irregularly shaped pieces (see Figs. 10 and 12), and are provided during such conversion with a finished article perimeter such as 10 and an at least partly surrounding shoulder such as 11 beyond said finished perimeter. Preferably also this converted piece is made of such a thickness as to produce a plurality of disks, or blanks for buttons, or the like. In the embodiment illustrated in Figs. 1 to 15, the converted piece is made with an additional perimeter 8, which with the perimeter 10 forms a plurality of article forming portions of different diameters, the shoulder 11 preferably being positioned between these two article forming portions. However, when it is so positioned, it provides in the article forming portion with the perimeter 8, an additional amount of material, the advantages for which will be hereinafter set forth. It is also preferred that the portion of larger diameter shall be situated adjacent the skin surface side 3 which is the superior quality portion of the nut piece. The converted pieces preferably each retain thereon an original surface side from the material from which it is cut and during such cutting may be provided with a formed and preferably finished surface 12, which extends transversely of the axis of the converted piece and is preferably in a plane substantially parallel with the plane of the skin side of the irregularly shaped piece. While it is preferred to provide the shoulder at a point between the two article forming portions of the converted piece, this shoulder need not be positioned at this point, but may be situated anywhere on the perimeter of the article forming portions, as, for instance, on the portion adjacent the gauge surface 3, as illustrated in Fig. 16.

Any suitable means may be employed for forming these converted pieces. In this instance, one side of the irregularly shaped piece is brought into engagement with a gauging device 4, preferably having a plurality of equidistantly arranged gauging points 5. These gauging points determine the plane of the converted piece and define such plane as parallel with the original or gauged side of the irregularly shaped piece. During the gauging, a holding tool or plunger 6 is brought into contact with the opposed side of the irregularly shaped piece to hold the irregularly shaped piece in firm engagement with the gauging device, the holding tool being rotatably mounted, so as to turn with the cutting tool and being at a point centrally arranged with reference to the annular series of gauging points. The cutting tool embodies, in this instance, a tubular cutter 7 and a blade cutter 9, the tubular cutter 7 forming the cylindrical surface or perimeter 8, while the blade cutter 9 forms the cylindrical surface or finished article forming perimeter 10, the shoulder 11, and the formed surface 12. The irregularly shaped piece is gauged preferably at the perimeter of a proposed disk or blank to be obtained from the converted piece, so that it is possible to cut the converted piece to the maximum diameter obtainable from the class to which the irregularly shaped piece belongs, this being possible due to its not being necessary to provide material in the irregularly shaped piece beyond the area of the converted piece for supporting purposes. It is also preferred to effect the relative movement between the cutting tool and the gauging device at a definite and fixed distance each time, so that the converted pieces will have the same thickness for each class of irregularly shaped pieces except for the differences in the curvature of the gauged side.

In producing the converted pieces, the diameter of the cutting tool 9 is so selected that a cylindrical surface or perimeter 8 is obtained which is slightly greater in diameter than the proposed article or articles to be cut from the converted piece in immediate proximity to the gauged side, but, in most instances, this perimeter 8 will be incomplete. This portion of the converted piece when nearest the skin side provides the highest grade articles, whereas the other portion, or that portion in proximity to the formed surface 12 does not always produce so high a grade and may be cut, in the first instance, to the diameter of the finished article or articles.

This manner of cutting the converted pieces has a number of advantages. First, the shoulder provides for the proper feed and handling of the converted pieces in automatic machinery in the different operations of the process. Second, the surplus material in the portion adjacent the gauged side protects the proposed article or articles in such portion, during rough bulk handling of the converted pieces. Third, the surplus material in the portion adjacent the gauged side also takes care of the possible shrinkage in such portion caused by natural drying after cutting. Fourth, the shoulder, when situated at the junction of the two article forming portions, provides a visual means for determining the division between the proposed articles and assists the operatives during many operations of the process in the setting and the adjutment of machines. Fifth, the shoulder also simplifies the operation of mechanically measuring the converted pieces.

The converted pieces will have a similar general outline, but will vary in some respects. One of the main variations will be the shape or curvature of the gauged side. Still other variations are illustrated in Fig. 12, where the cylindrical portion "a", in the first instance, will be incomplete, or where both cylindrical portions will be incomplete, as at "b", or the cylindrical portion 10 will be incomplete, as at "c". The converted pieces with incomplete article forming portions are separated from those having complete article forming portions in order that the converted pieces may be recut in their incomplete portions to provide complete portions of smaller size, as illustrated in Figs. 12, 13 and 14. Such separation may readily be made by hand but as all of the converted pieces are of uniform shape and have thereon a shoulder 11, they can and preferably are mechanically measured in any suitable manner for the maximum yield in disks, or blanks for buttons, or other articles obtainable therefrom.

The original surface or gauged side of each cylindrical piece is then removed to provide thereon a finished surface 14 and during such cutting the article forming portion 8 is reduced in diameter to that shown by the measuring operation. When the converted piece is incomplete in the article forming portion 10, this portion is recut in a similar manner to a smaller size, as illustrated in Figs 14 and 15. The plural blanks thus formed are divided transversely to obtain the single disks, blanks, or other articles, but this division is preferably not made until the final outer faces and perimeters of the proposed buttons or other articles have been provided, as in Figs. 11, 13, 14 and 15. The inner faces of either or both of these articles may be simultaneously provided during the dividing operation, if desired. The plural blanks or converted pieces may taper, as illustrated at 20 in Fig. 17. This figure shows in dotted lines the manner in which disks, or blanks for buttons, or the like, may be formed from the converted pieces. This form of the converted piece has some of the advantages of a piece with the surrounding shoulder in that it provides for automatically and mechanically handling the pieces during the process of forming the disks, or other articles therefrom. After the converted piece is formed it is handled similarly to the converted piece, illustrated in Figs. 1 to 15, that is the incomplete converted pieces are separated from the complete converted pieces and are measured and cut to obtain the maximum possibilities in disks, or blanks for buttons, or the like.

What we claim as our invention and desire to secure by Letters Patent is:

1. In a method of producing disks, buttons, or the like from irregularly shaped nut pieces, each having a skin surface thereon, the steps which consist in establishing a base plane roughly parallel to the skin side of each nut piece, severing from each irregularly shaped nut piece a blank having substantially circular characteristics and diameters of different lengths and still retaining the skin side, during such severing providing on the blank a finished button face on the side opposite the skin side, and, while maintaining diameters of different lengths in the blank, providing by a separate operation a finished button face on that side of the blank having the skin side.

2. In a method of producing disks, buttons, or the like, from irregularly shaped pieces of material, the steps which consist in severing from each irregularly shaped piece a blank having circular characteristics and still retaining an original surface side of the irregularly shaped piece, providing during such severing a finished button surface on the side of the blank opposite the original surface and at such a distance from said original surface that a plurality of buttons may be formed from the blank between the finished button face and the original surface side, measuring the blank thus formed adjacent its original surface side to ascertain the most desirable button obtainable from that portion of the blank nearest the original surface side, and cutting the blank to provide on the original surface side a finished button face and a finished button edge in accordance with the measurement without disturbing the finished button face on the opposite side.

3. In a method of producing disks, buttons, or the like from irregularly shaped nut pieces, each having a skin side thereon, the steps which consist in severing from each irregularly shaped nut piece a blank having circular characteristics and diameters of different lengths and still retaining the original skin side, providing on the blank during such severing a finished button surface on the side opposite the skin side, and, by a separate operation, while maintaining diameters of different lengths in the blank, cutting a finished button surface on the skin surface side.

4. In a method of producing disks, buttons, or the like, from irregularly shaped pieces of material, the steps which consist in severing from each irregularly shaped piece of material, a blank having circular characteristics and retaining an original surface side of the irregularly shaped piece of material, cutting during such severing on each blank an at least partially surrounding shoulder facing in the direction opposite to that of the original surface side, and, while maintaining a surrounding shoulder on the blank, cutting two finished faces by two different operations, at least one of which takes place after the blank is severed from the original irregularly shaped piece.

5. In a method of producing disks, buttons, or the like, from irregularly shaped nut pieces, each having a skin side thereon, the steps which consist in establishing a base plane roughly parallel to the skin side of each nut piece, severing from each irregularly shaped nut piece, a blank still retaining the skin surface and having substantially circular characteristics, providing on the blank during the severing an at least partially surrounding shoulder at a fixed distance from the base plane and, while maintaining a shoulder on the blank, cutting on the blank two opposed finished button faces by two different operations, at least one of which takes place after the blank is severed from the original irregularly shaped nut piece.

6. In a method of producing disks, buttons, or the like, from irregularly shaped nut pieces, each having a skin side thereon, the steps which consist in establishing a base plane roughly parallel to the skin side of each nut piece, severing from each irregularly shaped nut piece, a blank still retaining the skin surface and having substantially circular characteristics, providing on the blank during the severing an at least partially surrounding shoulder at a fixed distance from the base plane, and, during such severing providing on the blank a finished button face on the side opposite the skin side, and, by a separate operation, while maintaining a shoulder on the blank, removing the skin surface and providing a finished button face thereon.

7. A method of producing disks, buttons or the like from irregularly shaped nut pieces, each having a skin side thereon the steps which consist in establishing a base plane roughly parallel with the skin side of each nut piece, severing from each irregularly shaped nut piece a blank having circular characteristics and retaining the skin side, providing on the blank during such severing an at least partially surrounding shoulder at a fixed distance from the base plane and facing in the direction opposite to the direction from which the skin side faces, also providing on that side of the blank opposite the skin side a finished button face with a space between said finished button face and the shoulder, and cutting the blank to utilize the material of the portion between the finished button face and the shoulder in a final button.

8. The method of producing disks, buttons, or the like from irregularly shaped nut pieces each having a skin side thereon, the steps which consist in establishing a base plane roughly parallel with the skin side of each nut piece, severing from each irregularly shaped nut piece, a blank having substantially circular characteristics and retaining the skin side, providing on the blank during such severing an at least partially surrounding shoulder at a fixed distance from the base plane and facing in a direction opposite that in which the skin side faces, thereafter providing a finished surface on the skin side of the piece, and cutting the blank to utilize in a final article material of that portion between the side opposite the skin side and the shoulder.

9. The method of producing disks, or blanks for buttons, or the like, from irregularly shaped nut pieces, each having a skin surface thereon, the steps which consist in establishing a base plane roughly parallel with the skin surface of each nut piece, severing from such irregularly shaped nut pieces, blanks having substantially circular characteristics, and with a plurality of button forming portions of different diameters, and providing on such blanks finished button faces and edges which, at the given distances of the planes of the buttons from the established base plane have substantially the maximum possible diameters for the planes of the buttons available in the original irregularly shaped nut pieces at those planes.

10. The method of producing disks, or blanks for buttons, or the like from irregularly shaped nut pieces, each having a skin side thereon, the steps which consist in establishing a base plane roughly parallel with the skin side of each nut piece, severing from each irregularly shaped nut piece a blank having substantially circular characteristics and different diameters while retaining the skin side, providing on that side of the blank opposed to the skin side a finished button face, the diameter of which will be substantially equal to the minimum diameter of the irregularly shaped piece at the plane of the face, measuring the piece adjacent the skin side independently of the portion adjacent the opposite side, and after such measuring and while maintaining the blank with a plurality of different diameters providing on the skin side a button surface equal to the maximum obtainable from such measurement.

11. In a method of producing disks, or blanks for buttons or the like, from irregularly shaped nut pieces, each having a skin side thereon, which consists in establishing a base plane roughly parallel to the skin side of each nut piece, severing from each irregularly shaped nut piece a blank having substantially cylindrical characteristics, and still retaining the original skin side from which the base plane was established, and, during such severing, providing on the blank at least a partially surrounding shoulder at a fixed distance from the base plane and situated between the two sides of the severed piece and also providing on the piece a finished cylindrical article forming perimeter.

12. In a method of producing disks, or blanks for buttons, or the like, from irregularly shaped nut pieces, each having a skin side thereon which consists in establishing a base plane roughly parallel to the skin side of each piece, severing from each irregularly shaped nut piece a blank having substantially circular characteristics, and still retaining the original skin side of the irregularly shaped piece, and during such severing providing a plurality of article forming portions with a surrounding shoulder between them parallel with the base plane.

13. The method of producing disks, or blanks for buttons, or the like, from irregularly shaped nut pieces, each having a skin surface thereon, the steps which consists in establishing a base plane roughly parallel with the skin surface of each nut piece, severing from each irregularly shaped nut piece a piece having substantially cylindrical characteristics and retaining the skin surface, providing on the piece during such severing an at least partially surrounding shoulder at a fixed distance from the base plane, and providing on that surface of the piece opposite the skin surface a finished button face with a space between said finished button face and the shoulder.

14. In a method of producing disks, buttons, or the like, from irregularly shaped pieces of material, the steps which consist in severing from each irregularly shaped piece, a blank having substantially circular characteristics and a thickness sufficient to produce a plurality of buttons, providing on the blank during such severing an at least partially surrounding shoulder, measuring the blank by independent measuring operations adjacent each side thereof, and, while maintaining a surrounding shoulder, cutting in accordance with the measurements by separate cutting operations, finished button faces on each side of the blank.

15. In a method of producing disks, buttons, or the like, from irregularly shaped nut pieces, each having a skin surface thereon, the steps which consist in severing from each irregularly shaped nut piece, a blank having substantially circular characteristics, a thickness sufficient to produce a plurality of buttons, and still retaining the skin surface, providing on the blank during such severing an at least partially surrounding shoulder, and, while maintaining a surrounding shoulder on the blank, cutting finished button faces on each side of the blank at least one of said cutting operations occurring after the blank has been severed from the irregularly shaped nut piece.

16. In a method of producing disks, buttons, or the like, from irregularly shaped pieces, the steps which consist in severing from each irregularly shaped piece a blank having substantially circular characteristics, a thickness sufficient to produce a plurality of buttons, and still retaining an original surface side of the irregularly shaped piece, and providing on the blank during such severing an at least partially surrounding shoulder situated between the proposed buttons to be obtained from such blank.

17. In a method of producing disks, buttons, or the like, from irregularly shaped nut pieces, each having a skin surface thereon, the steps which consist in establishing a base plane roughly parallel with the skin surface of each nut piece, by contacts with the skin surface at, at least, three spaced points and substantially at the perimeter of a proposed finished article to be formed from such material, severing from such irregularly shaped nut pieces a blank having substantially circular characteristics, still retaining substantially the maximum thickness available in the original irregularly shaped nut piece for disks, buttons, or the like, and with the plane of each blank at right angles to the axis of the perimeter of the proposed finished article to be formed, and during such severing providing on the severed blank an at least partially surrounding shoulder parallel with the established base plane.

18. In a method of producing disks, buttons, or the like, from irregularly shaped nut pieces, each having a skin surface thereon, the steps which consist in establishing a base plane roughly parallel with the skin surface of each nut piece, by contacts with the skin surface at, at least, three spaced points and substantially at the perimeter of a proposed finished article to be formed from such material, severing from each irregularly shaped nut piece a blank having substantially circular characteristics and with the plane of the blank at right angles to the axis of the perimeter of the proposed finished article to be formed, and during such severing providing on the severed blank an at least partially surrounding shoulder parallel with the established base plane, and also during such severing providing on that face of the blank opposite the skin surface a finished button face.

19. In a method of producing disks, or blanks for buttons, or the like, from irregularly shaped pieces of material, the steps which consist in converting such pieces into circular pieces still retaining the maximum possibilities in disks, or blanks for buttons, or the like for each piece and each having a perimeter with a plurality of different diameters, separating the converted pieces with incomplete perimeters from those having complete perimeters and recutting to the largest possible button diameter each incomplete perimeter independently of the other perimeter without dividing the blank.

20. In a method of producing disks, buttons, or the like, from irregularly shaped nut pieces, the steps which consist in establishing a base plane roughly parallel with one of the sides of each nut piece by contact with said side at, at least, three spaced points and substantially at the perimeter of a proposed finished article to be formed from the material, severing from the material pieces, each retaining thereon, the surface side from which the base plane was established, during severing providing on each severed piece a formed surface on the side opposed to the side from which the base plane was established, parallel with said plane and at a fixed distance from the plane, and also providing a perimeter extending between the formed surface and the original side having a plurality of different diameters, and thereafter forming a finished surface and a finished perimeter on the side having the original surface side.

21. A method of producing disks, buttons, or the like from irregularly shaped pieces of material the steps which consist in roughly classifying such pieces for size, establishing a base plane roughly parallel with one surface of each piece by contact with such surface at, at least, three spaced points substantially at the perimeter of a proposed finished article to be formed from the material severing from the irregularly shaped pieces' mechanically measurable pieces, still retaining the maximum possibilities in disks, or blanks for buttons, or the like, for each class of the irregularly shaped pieces, and each still retaining the surface from which the base plane was established, providing during such severing in each piece a plurality of article forming portions with an, at least, partially surrounding shoulder and a formed surface on a side opposed to the side from which the base plane was established at a fixed distance from such base plane mechanically and accurately measuring such severed pieces for the maximum possibilities of disks, or blanks for buttons, or the like, and cutting the severed pieces in accordance with such mechanical measurements to obtain the maximum yield.

22. A converted piece of vegetable ivory for forming buttons or the like, circular in form, having thereon an original surface of the material from which the converted piece is formed, and a formed surface opposed to the first mentioned surface, the surrounding exterior of the converted piece between said two surfaces having a plurality of different diameters at least one of which is a finished edge for a button, or the like.

23. A converted piece of vegetable ivory for forming buttons or the like, circular in form, having an original surface of the material thereon, and a formed surface opposed to the first mentioned surface, the perimeter of the converted piece between said two surfaces having thereon an at least partly surrounding shoulder.

24. A converted piece of vegetable ivory for forming buttons or the like, circular in form, having thereon a surface of the material from which the converted piece is formed, and a formed surface opposed to the first mentioned surface, the perimeter of the converted piece between said two surfaces having a plurality of different diameters, the greatest of which is nearest the original surface side at least one of which is a finished edge for a button or the like.

25. A converted piece of vegetable ivory for forming buttons or the like, circular in form, having an original surface of the material thereon, provided with an article forming portion having a finished perimeter at least partly exposed, the converted piece having beyond the finished perimeter of such article forming portion an at least partly surrounding shoulder.

26. A converted piece of vegetable ivory for forming buttons or the like, circular in form, and having an original surface of the material thereon, and a plurality of article forming portions of different diameters.

27. A converted piece of vegetable ivory for forming buttons or the like, circular in form, and having an original surface of the material thereon, and a plurality of article forming portions of different diameters, the one of greatest diameter being adjacent the original surface side.

28. A converted piece of vegetable ivory for forming buttons or the like, circular in form, and having an original surface of the material thereon, a plurality of article forming portions of different diameters, and a finished surface on the side opposed to the original surface side.

29. A converted piece of vegetable ivory for forming buttons or the like, circular in form, having an original surface of the material thereon and a plurality of article forming portions of different diameters, and an at least partly surrounding shoulder.

30. A converted piece of vegetable ivory for forming buttons, or the like, circular in form and having the skin face on one side thereof, and a plurality of article forming portions of different diameters.

31. A converted piece of vegetable ivory for forming buttons, or the like, circular in form and, having on one side thereof, a surface formed by the original skin side of the material, said piece having a plurality of article forming portions of different diameters, the smallest diameter being nearest the side opposite the skin side and that portion of the piece with the smallest diameter having a final finished button edge provided thereon.

32. In a method of producing disks, buttons, or the like from irregularly shaped pieces of material, the steps which consist in severing from irregularly shaped pieces, a preliminary blank having circular characteristics and diameters of different lengths, and while maintaining a blank with diameters of different lengths, cutting on each such blank two cut external surfaces on the blank by different operations, at least one of which takes place after the preliminary blank is severed from the original irregularly shaped piece, whereby the maximum button capacity is secured from the blank.

33. In a method of producing disks, buttons, or the like from irregularly shaped pieces of material, the steps which consist in severing from the irregularly shaped pieces a plural blank having circular characteristics and diameters of different lengths, and while maintaining diameters of different lengths in the plural blank, cutting on the plural blank before its separation into disks or buttons, two finished external buttons faces on the blank by different operations at least one of which takes place after the blank is severed from the original irregularly shaped piece, whereby the maximum button capacity is secured from the blank, and thereafter dividing the plural blank into a plurality of disks, buttons, or the like.

HENRY T. NOYES.
RICHARD STANFORTH.